US012671112B2

(12) United States Patent
Saitou et al.

(10) Patent No.: US 12,671,112 B2
(45) Date of Patent: Jun. 30, 2026

(54) ELECTROLYTIC SOLUTION FOR SECONDARY BATTERY AND SECONDARY BATTERY

(71) Applicant: MURATA MANUFACTURING CO., LTD., Kyoto (JP)

(72) Inventors: Midori Saitou, Kyoto (JP); Takuju Hashimoto, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 801 days.

(21) Appl. No.: 17/895,331

(22) Filed: Aug. 25, 2022

(65) Prior Publication Data

US 2023/0018105 A1 Jan. 19, 2023

Related U.S. Application Data

(63) Continuation of application No. PCT/JP2020/042441, filed on Nov. 13, 2020.

(30) Foreign Application Priority Data

Feb. 25, 2020 (JP) ................................ 2020-029595

(51) Int. Cl.
*H01M 10/0567* (2010.01)
*H01M 10/0525* (2010.01)

(52) U.S. Cl.
CPC ... *H01M 10/0567* (2013.01); *H01M 10/0525* (2013.01)

(58) Field of Classification Search
CPC ...................... H01M 10/0567; H01M 10/0525
See application file for complete search history.

(56) References Cited

U.S. PATENT DOCUMENTS

| | | | | |
|---|---|---|---|---|
| 6,296,783 | B1 * | 10/2001 | Shindo | H01M 10/0565 526/167 |
| 6,569,572 | B1 | 5/2003 | Ochiai et al. | |
| 2004/0265700 | A1 * | 12/2004 | Ugawa | H01M 10/0525 429/94 |
| 2021/0050625 | A1 * | 2/2021 | Nozaki | H01M 4/525 |

FOREIGN PATENT DOCUMENTS

| | | | |
|---|---|---|---|
| CN | 1210613 | A | 3/1999 |
| CN | 1527433 | A | 9/2004 |
| JP | H07282849 | A | 10/1995 |
| JP | 2000090968 | A | 3/2000 |
| JP | 2000164247 | A | 6/2000 |

(Continued)

OTHER PUBLICATIONS

Takeda, S., Morimura, W., Liu, Y.-H., Sakai, T., and Saito, Y. (2016) Identification and formation mechanism of individual degradation products in lithium-ion batteries studied by liquid chromatography/ electrospray ionization mass spectrometry and atmospheric solid analysis probe mass spectrometry. (Year: 2016).*

(Continued)

*Primary Examiner* — Nicholas A Smith
*Assistant Examiner* — Benjamin Eli Kass-Mullet
(74) *Attorney, Agent, or Firm* — K&L Gates LLP

(57) ABSTRACT

A secondary battery includes a positive electrode, a negative electrode, and an electrolytic solution including a carbonic acid ester compound.

19 Claims, 2 Drawing Sheets

(56) References Cited

FOREIGN PATENT DOCUMENTS

| | | | |
|---|---|---|---|
| JP | 2001052743 | A | 2/2001 |
| JP | 2001210373 | A | 8/2001 |
| JP | 2002083629 | A | 3/2002 |
| JP | 2007220313 | A | 8/2007 |
| JP | 2008288126 | A | 11/2008 |
| JP | 2013026180 | A | 2/2013 |
| WO | 1998025275 | A1 | 6/1998 |
| WO | 2000010213 | A1 | 2/2000 |

OTHER PUBLICATIONS

Sahori Takeda, et al., Rapid Communications in Mass Spectrometry, 2016, 30, 1754-1762.
Japanese Office Action issued Jul. 18, 2023 in corresponding Japanese Application No. 2022-503092.
International Search Report of corresponding PCT application PCT/JP2020/042441, dated Jan. 26, 2021.
Office Action issued for corresponding Chinese Patent Application No. 202080097510.9, dated Oct. 15, 2025. (7 pages.).
Search Report issued for corresponding Chinese Patent Application No. 202080097510.9, dated Oct. 11, 2025. (3 pages.).
"Identification and formation mechanism of individual degradation products in lithium-ion batteries studied by liquid chromatography/electrospray ionization mass spectrometry and atmospheric solid analysis probe mass spectrometry", Sahori Takeda et al. Rapid Commun. Mass Spectrom. 2016, 30, 1754-1762.
Office Action issued for corresponding Chinese Patent Application No. 202080097510.9, dated Apr. 16, 2026. (9 pages.).

* cited by examiner

ELECTROLYTIC SOLUTION FOR SECONDARY BATTERY AND SECONDARY BATTERY

CROSS REFERENCE TO RELATED APPLICATIONS

The present application is a continuation of PCT patent application No. PCT/JP2020/042441, filed on Nov. 13, 2020, which claims priority to Japanese patent application no. JP2020-029595, filed on Feb. 25, 2020, the entire contents of which are incorporated herein by reference.

BACKGROUND

The present application relates to an electrolytic solution for a secondary battery and a secondary battery.

Various electronic apparatuses such as mobile phones have been widely used. Such widespread use has promoted the development of a secondary battery that is smaller in size and lighter in weight and allows for a higher energy density, as a power source. The secondary battery includes a positive electrode, a negative electrode, and an electrolytic solution (an electrolytic solution for a secondary battery). A configuration of the secondary battery has been considered in various ways.

Specifically, to achieve a superior high-temperature lifetime performance and a superior low-temperature discharge characteristic, an electrolytic solution includes a carbonyloxy ester compound. In addition, to achieve a superior cyclability characteristic, an electrolytic solution includes an alkylene biscarbonate compound.

Further, as a form of a chain carbonic acid ester, a trimer of the chain carbonic acid ester has been reported.

SUMMARY

The present application generally relates to battery technology.

The present application relates to an electrolytic solution for a secondary battery according to an embodiment.

The present application relates to a secondary battery according to an embodiment.

Although consideration of a performance of the secondary battery has been given in various ways, there is still room for improvement as a cyclability characteristic still remains insufficient.

The present technology has been made in view of such an issue, and is related to providing an electrolytic solution for a secondary battery and a secondary battery that are each able to achieve a superior cyclability characteristic according to an embodiment.

An electrolytic solution for a secondary battery according to an embodiment of the present technology includes a carbonic acid ester compound represented by Formula (1).

(1)

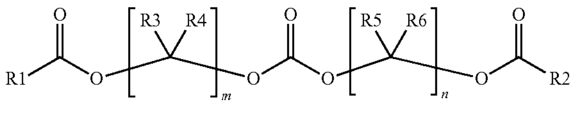

Where:

each of R1 and R2 is one of an alkyl group having carbon number of 1 or greater and 4 or less, an alkoxy group having carbon number of 1 or greater and 4 or less, an alkoxyalkoxy group having carbon number of 2 or greater and 4 or less, a hydroxyalkoxy group having carbon number of 1 or greater and 4 or less, a vinyl group, a vinyloxy group, a halogen group, or a hydroxyl group, in which, in a case where R1 is the alkoxy group, R2 is one of the alkyl group, the alkoxyalkoxy group, the hydroxyalkoxy group, the vinyl group, the vinyloxy group, the halogen group, or the hydroxyl group, and in a case where R1 is the hydroxyl group, R2 is one of the alkyl group, the alkoxy group, the alkoxyalkoxy group, the hydroxyalkoxy group, the vinyl group, the vinyloxy group, or the halogen group;

each of R3, R4, R5, and R6 is one of a hydrogen group, an alkyl group having carbon number of 1 or greater and 4 or less, or a halogen group; and each of m and n is 2 or 3.

A secondary battery according to an embodiment of the present technology includes a positive electrode, a negative electrode, and an electrolytic solution. The electrolytic solution has a configuration similar to the configuration of the electrolytic solution for a secondary battery according to an embodiment of the present technology described herein.

According to the electrolytic solution for a secondary battery or the secondary battery of an embodiment of the present technology, the electrolytic solution of a secondary battery (or the electrolytic solution) includes the carbonic acid ester compound described above. Accordingly, it is possible to achieve a superior cyclability characteristic.

Note that effects of the present technology are not necessarily limited to the effects described herein and may include any of a series of effects described in relation to the present technology.

DETAILED DESCRIPTION

The present technology is described in further detail below including with reference to the drawings according to an embodiment.

First, a description is given of a secondary battery according to an embodiment of the present technology. A description is given together below of an electrolytic solution for a secondary battery (hereinafter, simply referred to as "electrolytic solution") according to an embodiment of the present technology as the electrolytic solution is a part (an element) of the secondary battery.

The secondary battery described here is a secondary battery that obtains a battery capacity by utilizing insertion and extraction of an electrode reactant. The secondary battery includes a positive electrode, a negative electrode, and an electrolytic solution that is a liquid electrolyte. In the secondary battery, in order to prevent precipitation of the electrode reactant on a surface of the negative electrode in the middle of charging, a charge capacity of the negative electrode is greater than a discharge capacity of the positive electrode. In other words, an electrochemical capacity per unit area of the negative electrode is set to be greater than an electrochemical capacity per unit area of the positive electrode.

The electrode reactant is not limited to a particular kind. Specifically, the electrode reactant is a light metal such as an alkali metal or an alkaline earth metal. Examples of the alkali metal include lithium, sodium, and potassium. Examples of the alkali earth metal include beryllium, magnesium, and calcium.

In the following, a description is given of an example case where the electrode reactant is lithium. A secondary battery that obtains a battery capacity by utilizing insertion and extraction of lithium is a so-called lithium-ion secondary battery. In the lithium-ion secondary battery, lithium is inserted and extracted in an ionic state.

Figure 1:
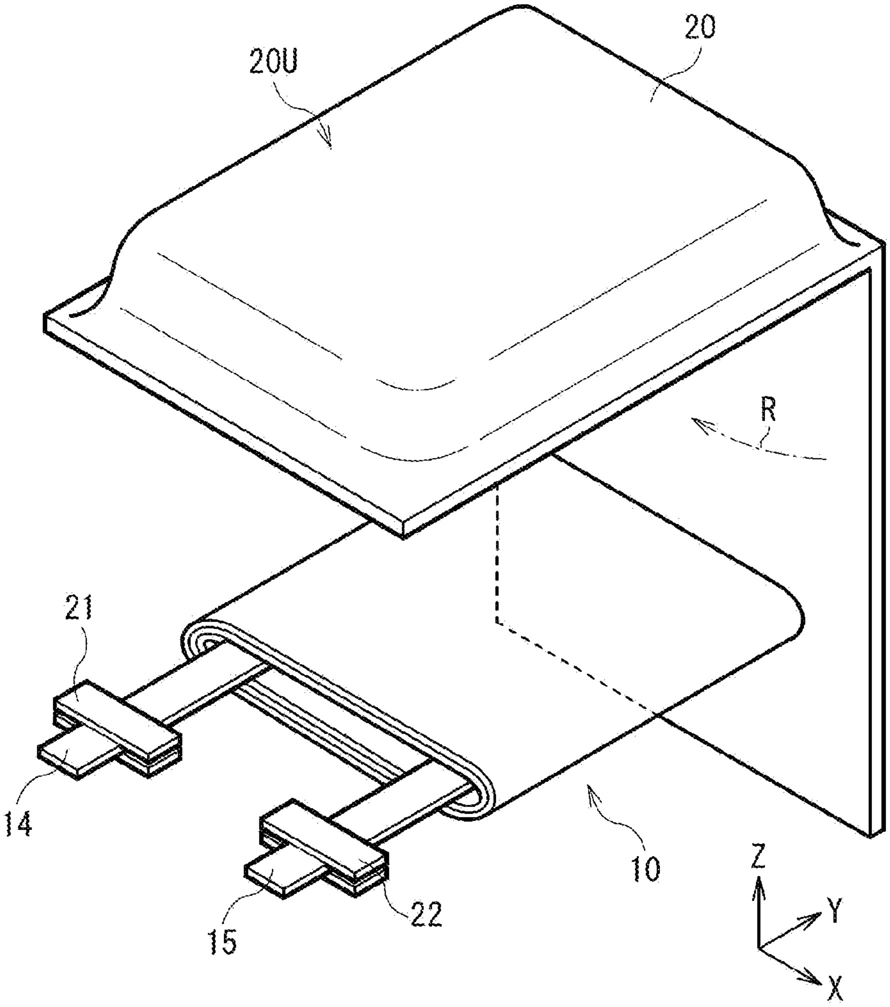
FIG. 1 is a perspective view of a configuration of a secondary battery according to an embodiment of the present technology.
Figure 2:
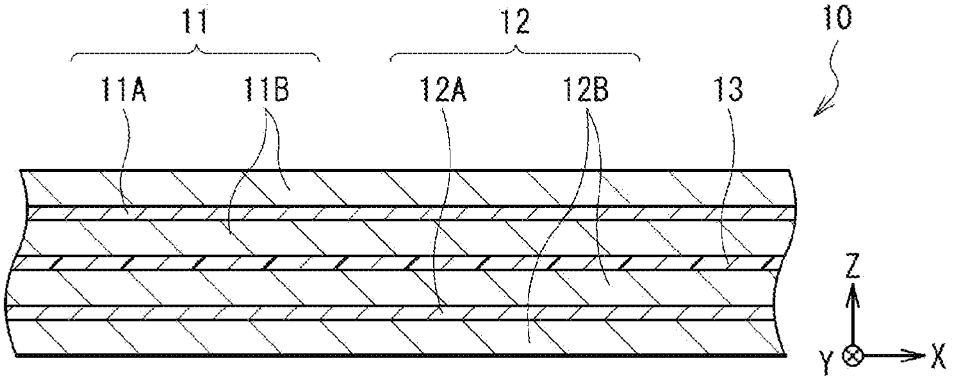
FIG. 2 is a sectional view of a configuration of a battery device illustrated in FIG. 1.

FIG. 1 illustrates a perspective configuration of the secondary battery, and FIG. 2 illustrates a sectional configuration of a battery device 10 illustrated in FIG. 1. Note that FIG. 1 illustrates a state in which the battery device 10 and an outer package film 20 are separated away from each other, and FIG. 2 illustrates only a portion of the battery device 10.

As illustrated in FIG. 1, the secondary battery includes the battery device 10, the outer package film 20, a positive electrode lead 14, and a negative electrode lead 15. The secondary battery described here is a secondary battery of a laminated-film type including an outer package member (the outer package film 20) having flexibility (or softness) as an outer package member for containing the battery device 10.

As illustrated in FIG. 1, the outer package film 20 is a single film-shaped member foldable in a direction of an arrow R (a dash-dot-dash line). As the outer package film 20 contains the battery device 10 as described above, the outer package film 20 contains an electrolytic solution as well as a positive electrode 11 and a negative electrode 12 described below. The outer package film 20 has a depression part 20U (a so-called deep drawn part) designed to contain the battery device 10.

Specifically, the outer package film 20 is a laminated film including three layers: a fusion-bonding layer, a metal layer, and a surface protective layer that are stacked in this order from the inner side. In a state where the outer package film 20 is folded, outer edges of the fusion-bonding layer opposed to each other are bonded (fusion-bonded) to each other. The fusion-bonding layer includes a polymer compound such as polypropylene. The metal layer includes a metal material such as aluminum. The surface protective layer includes a polymer compound such as nylon.

Note that the configuration (number of layers) of the outer package film 20 is not particularly limited. The outer package film 20 may thus include one layer, two layers, or four or more layers.

A sealing film 21 is interposed between the outer package film 20 and the positive electrode lead 14, and a sealing film 22 is interposed between the outer package film 20 and the negative electrode lead 15. Each of the sealing films 21 and 22 is a member for preventing outside air from entering inside the outer package film 20. The sealing films 21 and 22 each include one or more of polymer compounds including, without limitation, polyolefin, having adherence to corresponding one of the positive electrode lead 14 and the negative electrode lead 15. Examples of the polyolefin include polyethylene, polypropylene, modified polyethylene, and modified polypropylene. Note that the sealing film 21, the sealing film 22, or both may be omitted.

As illustrated in FIGS. 1 and 2, the battery device 10 is contained inside the outer package film 20 and includes the positive electrode 11, the negative electrode 12, a separator 13, and an electrolytic solution (not illustrated). The positive electrode 11, the negative electrode 12, and the separator 13 are each impregnated with the electrolytic solution.

The battery device 10 is a structure (wound electrode body) in which the positive electrode 11 and the negative electrode 12 are stacked on each other with the separator 13 interposed therebetween, and the stack of the positive electrode 11, the negative electrode 12, and the separator 13 is wound around a winding axis. Thus, the positive electrode 11 and the negative electrode 12 are opposed to each other with the separator 13 interposed therebetween. Note that the winding axis described above is an imaginary axis extending in a Y-axis direction.

Here, the battery device 10 has an elongated three-dimensional shape. That is, the shape of a sectional face of the battery device 10 crossing the winding axis (a sectional face along an XZ plane) is an elongated shape defined by a major axis and a minor axis. More specifically, the battery device 10 has an elongated and substantially oval shape. The major axis is an imaginary axis extending in an X-axis direction and having a relatively large length. The minor axis is an imaginary axis extending in a Z-axis direction crossing the X-axis direction and having a relatively small length.

As illustrated in FIG. 2, the positive electrode 11 includes a positive electrode current collector 11A having two opposed surfaces, and two positive electrode active material layers 11B provided on the respective opposed surfaces of the positive electrode current collector 11A. However, the positive electrode active material layer 11B may be provided only on one of the opposed surfaces of the positive electrode current collector 11A on a side where the positive electrode 11 is opposed to the negative electrode 12.

The positive electrode current collector 11A includes one or more of electrically conductive materials including, without limitation, metal materials. Examples of the metal material include aluminum, nickel, and stainless steel. The positive electrode active material layer 11B includes one or more of positive electrode active materials into which lithium is insertable and from which lithium is extractable. The positive electrode active material layer 11B may further include a material such as a positive electrode binder or a positive electrode conductor.

The positive electrode active material is not limited to a particular kind. Specifically, the positive electrode active material is a lithium-containing compound such as a lithium transition metal compound. The lithium transition metal compound is a compound including lithium and one or more of transition metal elements, and may further include one or more of other elements. The other elements are not limited to particular kinds as long as the other elements are elements other than a transition metal element. Specifically, the other elements are those belonging to Groups 2 to 15 in the long period periodic table. The lithium transition metal compound is not limited to a particular kind. Specifically, examples of the lithium transition metal compound include an oxide, a phosphoric acid compound, a silicic acid compound, and a boric acid compound.

Specific examples of the oxide include $LiNiO_2$, $LiCoO_2$, $LiCo_{0.98}Al_{0.01}Mg_{0.01}O_2$, $LiNi_{0.5}Co_{0.2}Mn_{0.3}O_2$, $LiNi_{0.8}Co_{0.15}Al_{0.05}O_2$, $LiNi_{0.33}Co_{0.33}Mn_{0.33}O_2$, $Li_{1.2}Mn_{0.52}Co_{0.175}Ni_{0.1}O_2$, $Li_{1.15}(Mn_{0.65}Ni_{0.22}Co_{0.13})O_2$, and $LiMn_2O_4$. Specific examples of the phosphoric acid compound include $LiFePO_4$, $LiMnPO_4$, $LiFe_{0.5}Mn_{0.5}PO_4$, and $LiFe_{0.3}Mn_{0.7}PO_4$.

The positive electrode binder includes one or more of materials including, without limitation, a synthetic rubber and a polymer compound. Examples of the synthetic rubber include a styrene-butadiene-based rubber, a fluorine-based rubber, and ethylene propylene diene. Examples of the polymer compound include polyvinylidene difluoride, polyimide, and carboxymethyl cellulose.

The positive electrode conductor includes one or more of electrically conductive materials including, without limitation, a carbon material. Examples of the carbon material include graphite, carbon black, acetylene black, and Ketjen black. The electrically conductive material may be a material such as a metal material or a polymer compound.

A method of forming the positive electrode active material layer 11B is not particularly limited. Specifically, the method of forming the positive electrode active material layer 11B includes one or more of methods including, without limitation, a coating method.

As illustrated in FIG. 2, the negative electrode 12 includes a negative electrode current collector 12A having two opposed surfaces, and two negative electrode active material layers 12B provided on the respective opposed surfaces of the negative electrode current collector 12A. However, the negative electrode active material layer 12B may be provided only on one of the opposed surfaces of the negative electrode current collector 12A on a side where the negative electrode 12 is opposed to the positive electrode 11.

The negative electrode current collector 12A includes one or more of electrically conductive materials including, without limitation, a metal material. Examples of the metal material include copper, aluminum, nickel, and stainless steel. The negative electrode active material layer 12B includes one or more of negative electrode active materials into which lithium is insertable and from which lithium is extractable. The negative electrode active material layer 12B may further include a material such as a negative electrode binder or a negative electrode conductor. Details of the negative electrode binder are similar to those of the positive electrode binder, and details of the negative electrode conductor are similar to those of the positive electrode conductor.

The negative electrode active material is not limited to a particular kind. Specifically, the negative electrode active material is a material such as a carbon material or a metal-based material. Examples of the carbon material include graphitizable carbon, non-graphitizable carbon, and graphite. Examples of the graphite include natural graphite and artificial graphite. The metal-based material is a material including one or more of elements among metal elements and metalloid elements that are each able to form an alloy with lithium. Examples of such metal elements and metalloid elements include silicon and tin. Note that the metal-based material may be a simple substance, an alloy, a compound, a mixture of two or more thereof, or a material including phases of two or more thereof.

Specific examples of the metal-based material include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ ($0<v\leq 2$), LiSiO, $SnO_w$ ($0<w\leq 2$), $SnSiO_3$, LiSnO, and $Mg_2Sn$. Note that v in $SiO_v$ may satisfy $0.2<v<1.4$.

A method of forming the negative electrode active material layer 12B is not particularly limited. Specifically, the method of forming the negative electrode active material layer 12B includes one or more of methods including, without limitation, a coating method, a vapor-phase method, a liquid-phase method, a thermal spraying method, and a firing (sintering) method.

As illustrated in FIG. 2, the separator 13 is an insulating porous film interposed between the positive electrode 11 and the negative electrode 12. The separator 13 allows lithium ions to pass therethrough while preventing contact between the positive electrode 11 and the negative electrode 12. The separator 13 includes one or more of polymer compounds including, without limitation, polytetrafluoroethylene, polypropylene, and polyethylene.

The electrolytic solution includes one or more of carbonic acid ester compounds represented by Formula (1).

(1)

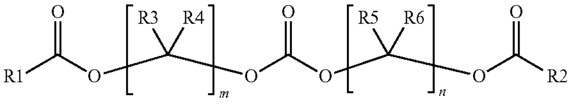

Where:

each of R1 and R2 is one of an alkyl group having carbon number of 1 or greater and 4 or less, an alkoxy group having carbon number of 1 or greater and 4 or less, an alkoxyalkoxy group having carbon number of 2 or greater and 4 or less, a hydroxyalkoxy group having carbon number of 1 or greater and 4 or less, a vinyl group, a vinyloxy group, a halogen group, or a hydroxyl group, in which, in a case where R1 is the alkoxy group, R2 is one of the alkyl group, the alkoxyalkoxy group, the hydroxyalkoxy group, the vinyl group, the vinyloxy group, the halogen group, or the hydroxyl group, and in a case where R1 is the hydroxyl group, R2 is one of the alkyl group, the alkoxy group, the alkoxyalkoxy group, the hydroxyalkoxy group, the vinyl group, the vinyloxy group, or the halogen group;

each of R3, R4, R5, and R6 is one of a hydrogen group, an alkyl group having carbon number of 1 or greater and 4 or less, or a halogen group; and each of m and n is 2 or 3.

The carbonic acid ester compound is a compound including one carbonic-acid-ester-type central group (—O—C(═O)—O—) and two ester-type terminal groups (—O—C(═O)—R1 and —O—C(═O)—R2). The central group is coupled to one of the terminal groups (—O—C(═O)—R1) through a linking group ($[\text{—CR3R4-}]_m$) and coupled to the other terminal group (—O—C(═O)—R2) through a linking group ($[\text{—CR5R6-}]_n$).

A reason why the electrolytic solution includes the carbonic acid ester compound is that a decomposition reaction of the electrolytic solution on locations including, without limitation, a surface of the negative electrode 12 is reduced as a film derived from the carbonic acid ester compound is formed on the surface of the negative electrode 12 and other locations upon charging and discharging. Details of the reason why the electrolytic solution includes the carbonic acid ester compound is described below.

Here, a configuration of the carbonic acid ester compound, i.e., details of Formula (1) are as described below.

As described above, R1 is not particularly limited as long as R1 is one of the alkyl group (carbon number from 1 to 4), the alkoxy group (carbon number from 1 to 4), the alkoxyalkoxy group (carbon number from 2 to 4), the hydroxyalkoxy group (carbon number from 1 to 4), the vinyl group (—CH═$CH_2$), the vinyloxy group (—OCH═$CH_2$), the halogen group, or the hydroxyl group (—OH).

The alkyl group is a monovalent group including carbon and hydrogen, and may have a straight-chain structure or a branched structure having one or more side chains. As the alkyl group has the carbon number from 1 to 4, specific examples thereof include a methyl group, an ethyl group, a propyl group, and a butyl group. Note that the propyl group may be any of an n-propyl group or an isopropyl group, and the butyl group is any of an n-butyl group, an isobutyl group, a sec-butyl group, or a tert-butyl group.

A reason why the alkyl group has the carbon number from 1 to 4 is that properties including, without limitation, solubility and compatibility of the carbonic acid ester compound improve, as compared with a case where the alkyl group has carbon number of 5 or greater. In particular, it is preferable that the alkyl group have carbon number of 3 or less. A reason for this is that the properties including, without limitation, the solubility and compatibility of the carbonic acid ester compound further improve.

The alkoxy group is a monovalent group in which the alkyl group and an oxy group (—O—) are coupled to each other. As the details of the alkyl group are as described above, the alkyl group may have a straight-chain structure or a branched structure. As the alkoxy group has the carbon number from 1 to 4, specific examples thereof include a methoxy group, an ethoxy group, a propoxy group, and a butoxy group.

A reason why the alkoxy group has the carbon number from 1 to 4 is that the properties including, without limitation, the solubility and compatibility of the carbonic acid ester compound improve, which is similar to the reason why the alkyl group has the carbon number from 1 to 4. In particular, it is preferable that the alkoxy group have carbon number of 3 or less. A reason for this is that the properties including, without limitation, the solubility and compatibility of the carbonic acid ester compound further improve.

The alkoxyalkoxy group is a group in which one hydrogen group of a plurality of hydrogen groups included in the alkoxy group is substituted by one alkoxy group. As the details of the alkoxy group are as described above, the alkyl group in the alkoxy group may have a straight-chain structure or a branched structure. As the alkoxyalkoxy group has the carbon number from 2 to 4, specific examples thereof include a methoxymethoxy group, an ethoxymethoxy group, a propoxymethoxy group, a methoxyethoxy group, an ethoxyethoxy group, and a methoxypropoxy group.

A reason why the alkoxyalkoxy group has the carbon number from 2 to 4 is that the properties including, without limitation, the solubility and compatibility of the carbonic acid ester compound improve, which is similar to the reason why the alkyl group has the carbon number from 1 to 4.

The hydroxyalkoxy group is a group in which one hydrogen group of a plurality of hydrogen groups included in the alkoxy group is substituted by one hydroxyl group. As the details of the alkoxy group are as described above, the alkyl group in the alkoxy group may have a straight-chain structure or a branched structure. As the hydroxyalkoxy group has the carbon number from 1 to 4, specific examples thereof include a hydroxymethoxy group, a hydroxyethoxy group, a hydroxypropoxy group, and a hydroxybutoxy group.

A reason why the hydroxyalkoxy group has the carbon number from 1 to 4 is that the properties including, without limitation, the solubility and compatibility of the carbonic acid ester compound improve, which is similar to the reason why the alkyl group has the carbon number 1 to 4.

The halogen group is a group including elements belonging to Group 17 in the long period periodic table. Specific examples of the halogen group include a fluorine group, a chlorine group, a bromine group, and an iodine group. In particular, it is preferable that the halogen group be the fluorine group. A reason for this is that a film derived from the carbonic acid ester compound is easily formed.

In particular, it is preferable that R1 be a group other than the alkoxyalkoxy group and the hydroxyalkoxy group. That is, it is preferable that R1 be one of the alkyl group (carbon number from 1 to 4), the alkoxy group (carbon number from 1 to 4), the vinyl group, the vinyloxy group, the halogen group, or the hydroxyl group. A reason for this is that a film derived from the carbonic acid ester compound is easily formed, as compared with the case where R1 is one of the alkoxyalkoxy group or the hydroxyalkoxy group.

The details of R1 described here similarly apply to R2. That is, R2 is not particularly limited as long as R2 is one of the alkyl group (carbon number from 1 to 4), the alkoxy group (carbon number from 1 to 4), the alkoxyalkoxy group (carbon number from 2 to 4), the hydroxyalkoxy group (carbon number from 1 to 4), the vinyl group, the vinyloxy group, the halogen group, or the hydroxyl group. Note that R1 and R2 may be identical in kind with each other or may be different in kind from each other.

However, in a case where R1 is the alkoxy group, R2 is a group other than the alkoxy group. That is, R2 is one of the alkyl group (carbon number from 1 to 4), the alkoxyalkoxy group (carbon number from 2 to 4), the hydroxyalkoxy group (carbon number from 1 to 4), the vinyl group, the vinyloxy group, the halogen group, or the hydroxyl group. Thus, a compound in which both of R1 and R2 are the alkoxy groups is excluded from the carbonic acid ester compound described here. A reason for this is that a film derived from the carbonic acid ester compound is easily formed.

In a case where R1 is the hydroxyl group, R2 is a group other than the hydroxyl group. That is, R2 is one of the alkyl group (carbon number from 1 to 4), the alkoxy group (carbon number from 1 to 4), the alkoxyalkoxy group (carbon number from 2 to 4), the hydroxyalkoxy group (carbon number from 1 to 4), the vinyl group, the vinyloxy group, or the halogen group. Thus, a compound in which both of R1 and R2 are the hydroxyl groups is excluded from the carbonic acid ester compound described here. A reason for this is that a film derived from the carbonic acid ester compound is easily formed.

As described above, each of R3 to R6 is not particularly limited as long as each of R3 to R6 is one of the hydrogen group, the alkyl group (carbon number from 1 to 4), or the halogen group. The details of each of the alkyl group (carbon number from 1 to 4) and the halogen group are as described above. Note that R3 to R6 may be identical in kind with each other or may be different in kind from each other. As a matter of course, only some (any two or three) of R3 to R6 may be identical in kind with each other.

In particular, it is preferable that each of R3 to R6 be a group other than the halogen group. That is, it is preferable that each of R3 to R6 be one of the hydrogen group or the alkyl group (carbon number from 1 to 4). A reason for this is that a film derived from the carbonic acid ester compound is easily formed.

As described above, each of m and n is not particularly limited as long as each of m and n is 2 or 3. A reason for this is that a film derived from the carbonic acid ester compound is easily formed, as compared with a case where each of m and n is 1. Another reason for this is that the properties including, without limitation, the solubility and compatibility of the carbonic acid ester compound improve, as compared with a case where each of m and n is 4 or greater.

In particular, it is preferable that each of m and n be 2. Reasons for this are that a film derived from the carbonic acid ester compound is easily formed and that the properties including, without limitation, the solubility and compatibility of the carbonic acid ester compound improve.

Specific examples of the carbonic acid ester compound are not particularly limited as long as the specific examples of the carbonic acid ester compound are compounds satisfying the conditions indicated by Formula (1). Examples of the carbonic acid ester compound include compounds represented by respective Formulae (1-1) to (1-42).

(1-1)

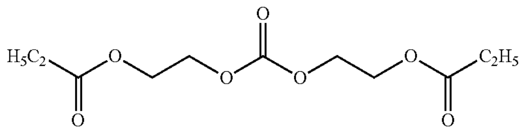

(1-2)

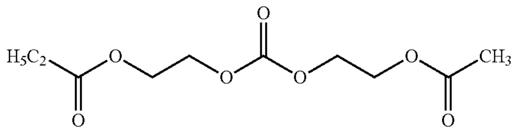

(1-3)

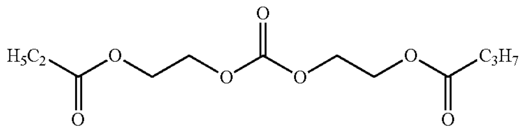

(1-4)

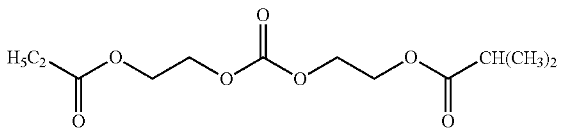

(1-5)

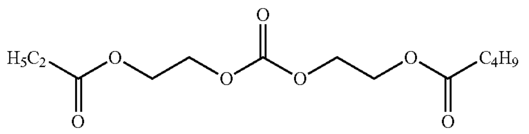

(1-6)

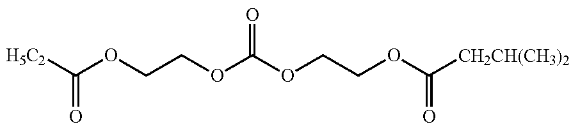

(1-7)

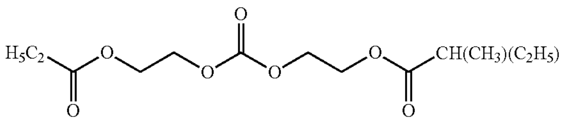

(1-8)

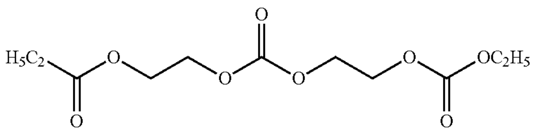

-continued (1-9)

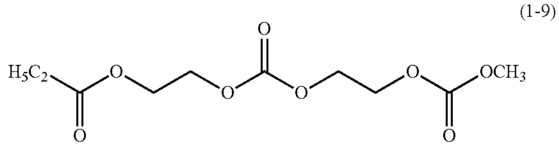

(1-10)

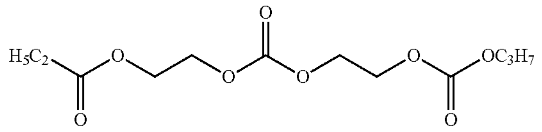

(1-11)

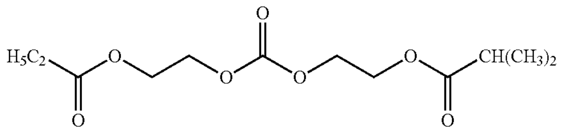

(1-12)

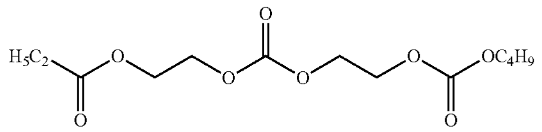

(1-13)

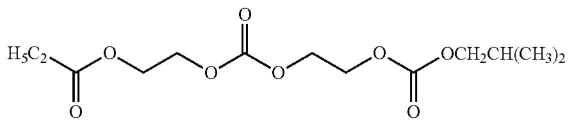

(1-14)

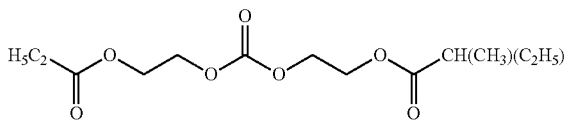

(1-15)

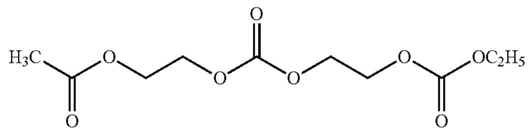

(1-16)

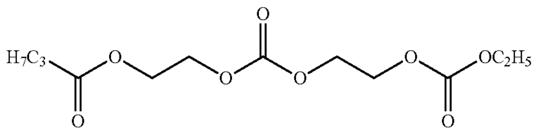

(1-17)

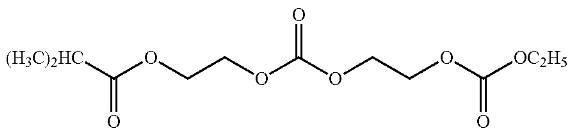

(1-18)

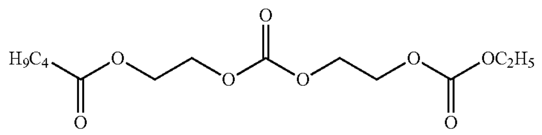

-continued
(1-19)
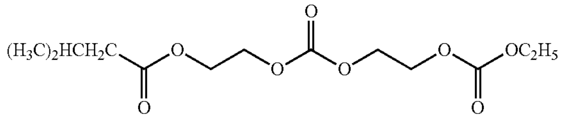
(1-20)
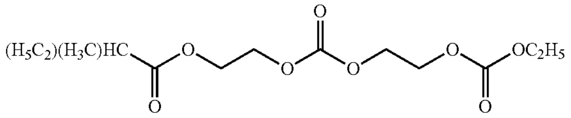
(1-21)
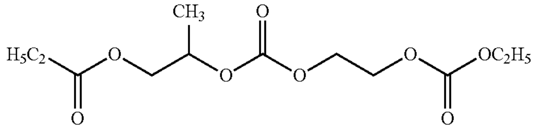
(1-22)
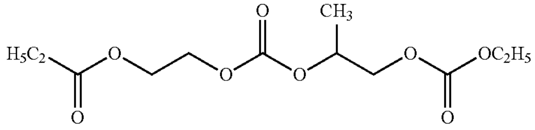
(1-23)
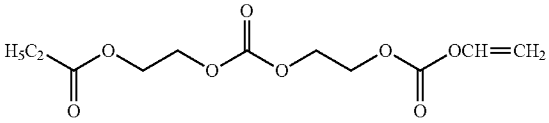
(1-24)
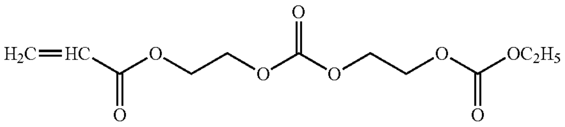
(1-25)
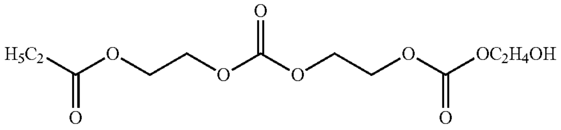
(1-26)
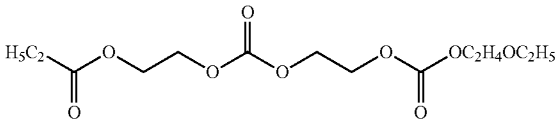
(1-27)
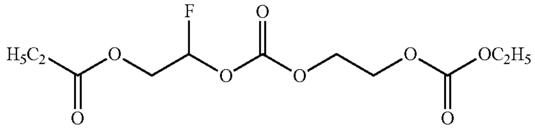
(1-28)
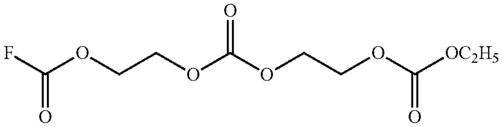
-continued
(1-29)
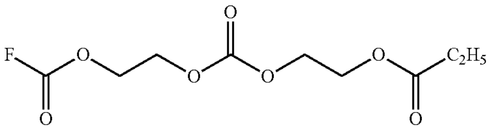
(1-30)
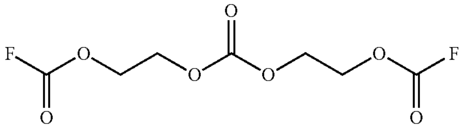
(1-31)
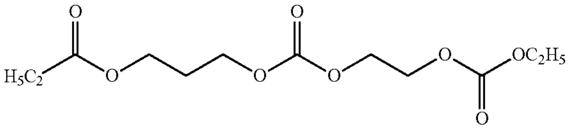
(1-32)
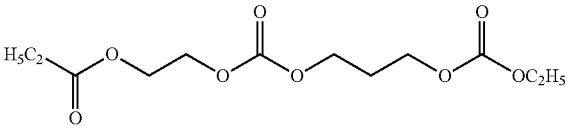
(1-33)
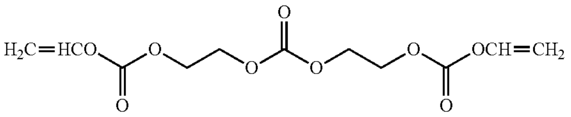
(1-34)
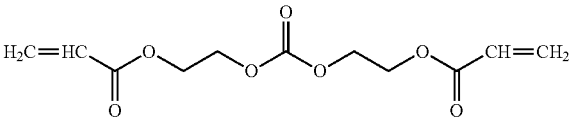
(1-35)
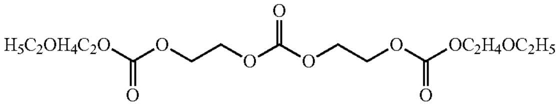
(1-36)
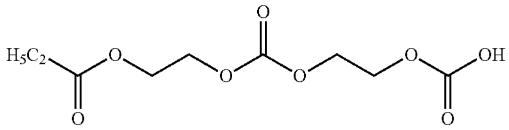
(1-37)
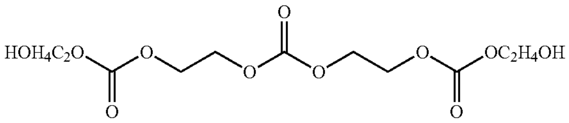
(1-38)
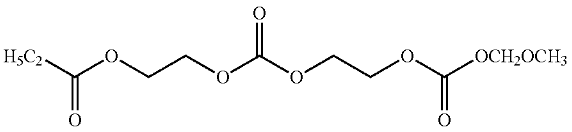

-continued (1-39)

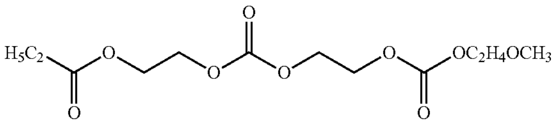

(1-40)

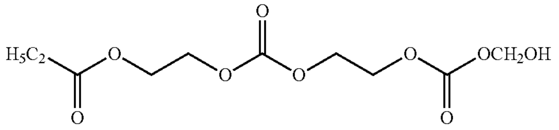

(1-41)

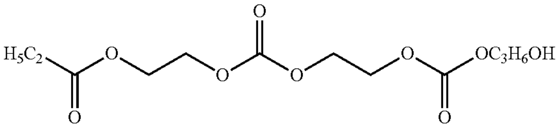

(1-42)

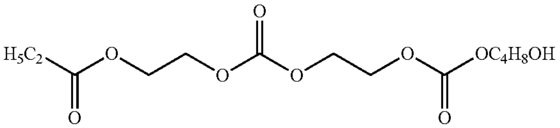

The content of the carbonic acid ester compound in the electrolytic solution is not particularly limited. In particular, it is preferable that the content of the carbonic acid ester compound in the electrolytic solution be 3 wt % or less, more preferably, from 0.01 wt % to 3 wt %. A reason for this is that the decomposition reaction of the electrolytic solution is sufficiently reduced as a firm film is easily and stably formed. Note that the content of the carbonic acid ester compound described here is a value after a stabilization process of a secondary battery described below.

The electrolytic solution may further include a solvent and an electrolyte salt. Only one kind of solvent may be included or two or more kinds of solvents may be included. In addition, only one kind of electrolyte salt may be included or two or more kinds of electrolyte salts may be included. However, the carbonic acid ester compound described above is excluded from the solvent described here.

The solvent includes a non-aqueous solvent (an organic solvent). An electrolytic solution including the non-aqueous solvent is a so-called non-aqueous electrolytic solution. Examples of the non-aqueous solvent include esters and ethers. More specific examples of the non-aqueous solvent include a carbonic-acid-ester-based compound, a carboxylic-acid-ester-based compound, and a lactone-based compound.

Examples of the carbonic-acid-ester-based compound include a cyclic carbonic acid ester and a chain carbonic acid ester. Specifically, examples of the cyclic carbonic acid ester include ethylene carbonate and propylene carbonate. Examples of the chain carbonic acid ester include dimethyl carbonate, diethyl carbonate, and methyl ethyl carbonate. Examples of the carboxylic-acid-ester-based compound include a chain carboxylic acid ester. Specifically, examples of the chain carboxylic acid ester include methyl acetate, ethyl acetate, methyl propionate, ethyl propionate, propyl propionate, and ethyl trimethylacetate. Examples of the lactone-based compound include a lactone. Specifically, examples of the lactone include γ-butyrolactone and γ-valerolactone. Examples of the ethers may include the lactone-based compound described above and 1,2-dimethoxy ethane, tetrahydrofuran, 1,3-dioxolane, and 1,4-dioxane.

Examples of the non-aqueous solvent include an unsaturated cyclic carbonic acid ester, a halogenated carbonic acid ester, a sulfonic acid ester, a phosphoric acid ester, an acid anhydride, a nitrile compound, and an isocyanate compound. A reason for this is that chemical stability of the electrolytic solution improves.

Specifically, examples of the unsaturated cyclic carbonic acid ester include vinylene carbonate (1,3-dioxol-2-one), vinyl ethylene carbonate (4-vinyl-1,3-dioxolane-2-one), and methylene ethylene carbonate (4-methylene-1,3-dioxolane-2-one). Examples of the halogenated carbonic acid ester include fluoroethylene carbonate (4-fluoro-1,3-dioxolane-2-one) and difluoroethylene carbonate (4,5-difluoro-1,3-dioxolane-2-one). Examples of the sulfonic acid ester include 1,3-propane sultone and 1,3-propene sultone. Examples of the phosphoric acid ester include trimethyl phosphate and triethyl phosphate.

Examples of the acid anhydride include a cyclic dicarboxylic acid anhydride, a cyclic disulfonic acid anhydride, and a cyclic carboxylic acid sulfonic acid anhydride. Examples of the cyclic dicarboxylic acid anhydride include succinic anhydride, glutaric anhydride, and maleic anhydride. Examples of the cyclic disulfonic acid anhydride include ethane disulfonic anhydride and propane disulfonic anhydride. Examples of the cyclic carboxylic acid sulfonic acid anhydride include sulfobenzoic anhydride, sulfopropionic anhydride, and sulfobutyric anhydride.

Examples of the nitrile compound include acetonitrile, succinonitrile, and adiponitrile. Examples of the isocyanate compound include hexamethylene diisocyanate.

In particular, it is preferable that the non-aqueous solvent include the cyclic carbonic acid ester, the chain carbonic acid ester, and the chain carboxylic acid ester. Reasons for this are that the properties including, without limitation, the solubility and compatibility of the carbonic acid ester compound sufficiently improve, and that a film derived from the carbonic acid ester compound is easily and sufficiently formed.

The electrolyte salt is a light metal salt such as a lithium salt. Examples of the lithium salt include lithium hexafluorophosphate ($LiPF_6$), lithium tetrafluoroborate ($LiBF_4$), lithium trifluoromethanesulfonate ($LiCF_3SO_3$), lithium bis(fluorosulfonyl)imide ($LiN(FSO_2)_2$), lithium bis(trifluoromethane sulfonyl)imide ($LiN(CF_3SO_2)_2$), lithium tris(trifluoromethanesulfonyl)methide ($LiC(CF_3SO_2)_3$), and lithium bis(oxalate)borate ($LiB(C_2O_4)_2$). Although the content of the electrolyte salt is not particularly limited, the content of the electrolyte salt is 0.3 mol/kg to 3.0 mol/kg with respect to the solvent. A reason for this is that high ionic conductivity is obtainable.

The positive electrode lead 14 is a positive electrode terminal coupled to the positive electrode 11 (the positive electrode current collector 11A). The positive electrode lead 14 includes one or more of electrically conductive materials including, without limitation, aluminum. The negative electrode lead 15 is a negative electrode terminal coupled to the negative electrode 12 (the negative electrode current collector 12A). The negative electrode lead 15 includes one or more of electrically conductive materials including, without limitation, copper, nickel, and stainless steel. The positive electrode lead 14 and the negative electrode lead 15 each have a shape such as a thin plate shape or a meshed shape.

Here, as illustrated in FIG. 1, the positive electrode lead 14 and the negative electrode lead 15 are each led out from inside the outer package film 20 to outside in a common direction. However, the positive electrode lead 14 and the negative electrode lead 15 may be led out in different directions.

Here, the number of the positive electrode leads 14 is one. However, the number of the positive electrode leads 14 is not particularly limited and may be two or greater. In particular, in a case where the number of the positive electrode leads 14 is two or greater, electric resistance of the secondary battery lowers. The description of the number of the positive electrode leads 14 given here similarly applies to the number of the negative electrode leads 15. Thus, the number of the negative electrode leads 15 is not limited to one and may be two or greater.

Upon charging the secondary battery, lithium is extracted from the positive electrode 11, and the extracted lithium is inserted into the negative electrode 12 via the electrolytic solution. In contrast, upon discharging the secondary battery, lithium is extracted from the negative electrode 12, and the extracted lithium is inserted into the positive electrode 11 via the electrolytic solution. Upon charging and discharging the secondary battery, lithium is inserted and extracted in an ionic state.

In a case of manufacturing the secondary battery, the positive electrode 11 and the negative electrode 12 are fabricated and the electrolytic solution is prepared, following which the secondary battery is fabricated using the positive electrode 11, the negative electrode 12, and the electrolytic solution, according to a procedure described below.

First, the positive electrode active material is mixed with a material such as the positive electrode binder or the positive electrode conductor to thereby obtain a positive electrode mixture. Thereafter, the positive electrode mixture is put into a solvent such as an organic solvent to thereby prepare a positive electrode mixture slurry in a paste state. Lastly, the positive electrode mixture slurry is applied on each of the two opposed surfaces of the positive electrode current collector 11A to thereby form the positive electrode active material layer 11B. Thereafter, the positive electrode active material layer 11B may be compression-molded using a machine such as a roll pressing machine. In this case, the positive electrode active material layer 11B may be heated or may be compression-molded multiple times. The positive electrode active material layer 11B is thus formed on each of the two opposed surfaces of the positive electrode current collector 11A. As a result, the positive electrode 11 is fabricated.

The negative electrode active material layer 12B is formed on each of the two opposed surfaces of the negative electrode current collector 12A by a procedure similar to the fabrication procedure of the positive electrode 11 described above. Specifically, the negative electrode active material is mixed with, on an as-needed basis, a material such as the negative electrode binder or the negative electrode conductor to thereby obtain a negative electrode mixture. Thereafter, the negative electrode mixture is put into a solvent such as an organic solvent to thereby prepare a negative electrode mixture slurry in a paste state. Thereafter, the negative electrode mixture slurry is applied on each of the two opposed surfaces of the negative electrode current collector 12A to thereby form the negative electrode active material layer 12B. Thereafter, the negative electrode active material layer 12B may be compression-molded. The negative electrode active material layer 12B is thus formed on each of the two opposed surfaces of the negative electrode current collector 12A. As a result, the negative electrode 12 is fabricated.

The electrolyte salt is put into the solvent, following which the carbonic acid ester compound is added to the solvent. The electrolyte salt and the carbonic acid ester compound are thus each dispersed or dissolved into the solvent. As a result, the electrolytic solution is prepared.

First, the positive electrode lead 14 is coupled to the positive electrode 11 (the positive electrode current collector 11A) by a method such as a welding method, and the negative electrode lead 15 is coupled to the negative electrode 12 (the negative electrode current collector 12A) by a method such as a welding method.

Thereafter, the positive electrode 11 and the negative electrode 12 are stacked on each other with the separator 13 interposed therebetween, following which the stack of the positive electrode 11, the negative electrode 12, and the separator 13 is wound to thereby fabricate a wound body. The wound body has a configuration similar to the configuration of the battery device 10 except that the positive electrode 11, the negative electrode 12, and the separator 13 are not each impregnated with the electrolytic solution. Thereafter, the wound body is molded into an elongated shape by pressing the wound body with a machine such as a pressing machine.

Thereafter, the wound body is placed into the depression part 20U, and the outer package film 20 is folded such that two sides of the outer package film 20 are opposed to each other. Thereafter, the outer edges of the two sides of the outer package film 20 (the fusion-bonding layer) opposed to each other are bonded with each other using a method such as a thermal-fusion-bonding method. The wound body is thereby placed into the outer package film 20 having a pouch shape.

Lastly, the electrolytic solution is injected into the outer package film 20 having the pouch shape, following which the outer edges of the remaining one side of the outer package film 20 (the fusion-bonding layer) are bonded with each other using a method such as a thermal-fusion-bonding method. In this case, the sealing film 21 is disposed between the outer package film 20 and the positive electrode lead 14, and the sealing film 22 is disposed between the outer package film 20 and the negative electrode lead 15. The wound body is thereby impregnated with the electrolytic solution. Thus, the battery device 10 that is a wound electrode body is fabricated. Accordingly, the battery device 10 is sealed in the outer package film 20 having the pouch shape. As a result, the secondary battery is assembled.

The secondary battery after being assembled is charged and discharged. Various conditions, including, without limitation, an environment temperature, the number of times of charging and discharging (number of cycles), and charging and discharging conditions may be set to any values. A film is thereby formed on a surface of the negative electrode 12 and other components, which electrochemically stabilizes a state of the secondary battery. As a result, the secondary battery including the outer package film 20, i.e., the secondary battery of the laminated-film type is completed.

According to the secondary battery, the electrolytic solution includes the carbonic acid ester compound. Thus, as described above, a film derived from the carbonic acid ester compound is formed on a surface of the negative electrode 12 and other locations upon charging and discharging. Accordingly, the decomposition reaction of the electrolytic solution on locations including, without limitation, the surface of the negative electrode 12 is reduced.

In this case, in particular, the carbonic acid ester compound has a configuration similar to the configuration of a trimer of the chain carbonic acid ester as indicated by Formula (1). Thus, the carbonic acid ester compound has a molecular weight greater than each of the molecular weight of a monomer and the molecular weight of a dimer. Accordingly, a uniform film is easily formed as the carbonic acid ester compound has a sufficiently large molecular weight.

In addition, the carbonic acid ester compound includes the two ester-type terminal groups (—O—C(=O)—R1 and —O—C(=O)—R2). This facilitates progress in reduction reaction of the carbonic acid ester compound. Accordingly, a film is easily formed using the reduction reaction of the carbonic acid ester compound upon charging and discharging.

This helps to prevent the discharge capacity from decreasing even after repeated charging and discharging, as compared with a case where the electrolytic solution includes no carbonic acid ester compound and a case where the electrolytic solution includes a compound other than the carbonic acid ester compound. Accordingly, it is possible to achieve a superior cyclability characteristic.

Note that the other compound described above is a compound not satisfying the conditions indicated by Formula (1). Specific examples of the other compound include compounds represented by respective Formulae (1-51) to (1-67).

(1-51)

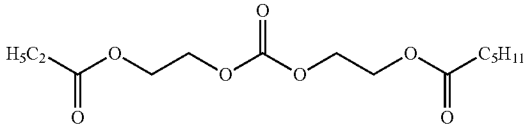

(1-52)

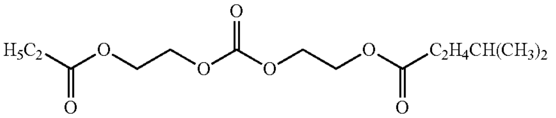

(1-53)

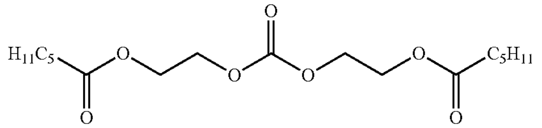

(1-54)

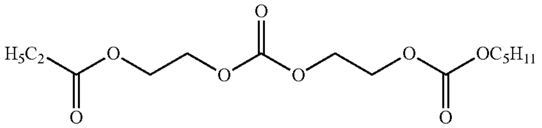

(1-55)

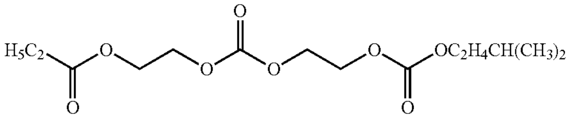

(1-56)

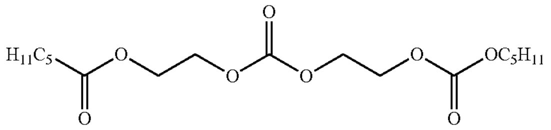

-continued (1-57)

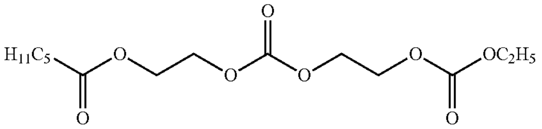

(1-58)

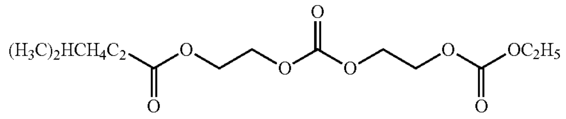

(1-59)

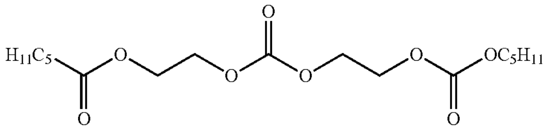

(1-60)

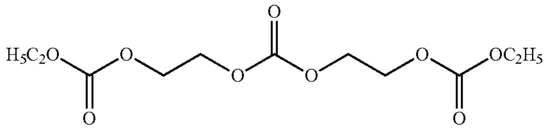

(1-61)

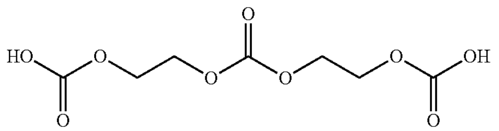

(1-62)

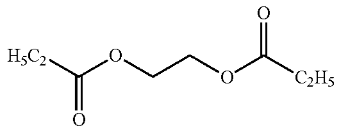

(1-63)

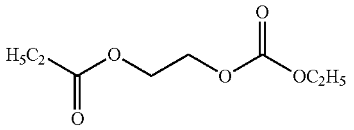

(1-64)

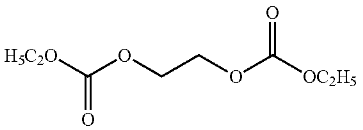

(1-65)

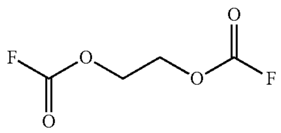

(1-66)

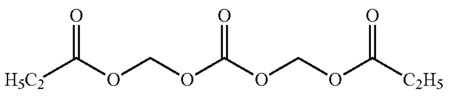

(1-67)

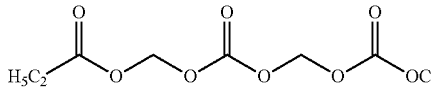

A main configuration of the other compound is as described above. In the compound represented by each of Formulae (1-51) to (1-59), R1, R2, or both are alkyl groups each having carbon number of 5 or greater or alkoxy groups each having carbon number of 5 or greater. In the compound represented by Formula (1-60), both of R1 and R2 are alkoxy groups. In the compound represented by Formula (1-61), both of R1 and R2 are hydroxyl groups. The compounds represented by the respective Formulae (1-62) to (1-65) do not include the carbonic-acid-ester-type central group (—O—C(═O)—O—). In the compounds represented by respective Formula (1-66) and Formula (1-67), both of m and n are 1.

In particular, the alkyl group and the alkoxy group may each have carbon number of 3 or less in terms of each of R1 and R2. This further improves the properties including, without limitation, the solubility and compatibility of the carbonic acid ester compound. Accordingly, it is possible to provide higher effects.

In addition, each of m and n may be 2. This allows a film derived from the carbonic acid ester compound to be formed more easily and further improves the properties including, without limitation, the solubility and compatibility of the carbonic acid ester compound. Accordingly, it is possible to provide higher effects.

In addition, each of R1 and R2 may be one of the alkyl group, the alkoxy group, the vinyl group, the vinyloxy group, the halogen group, or the hydroxyl group. This allows a film derived from the carbonic acid ester compound to be easily formed. Accordingly, it is possible to provide higher effects.

In addition, each of R3 to R6 may be one of the hydrogen group or the alkyl group. This allows a film derived from the carbonic acid ester compound to be easily formed. Accordingly, it is possible to provide higher effects.

In addition, the content of the carbonic acid ester compound in the electrolytic solution may be 3 wt % or less, preferably from 0.01 wt % to 3 wt %. This allows a firm film to be easily and stably formed, sufficiently reducing the decomposition reaction of the electrolytic solution. Accordingly, it is possible to provide higher effects.

In addition, the electrolytic solution may further include the cyclic carbonic acid ester, the chain carbonic acid ester, and the chain carboxylic acid ester. This sufficiently improves the properties including, without limitation, the solubility and compatibility of the carbonic acid ester compound, and allows a film derived from the carbonic acid ester compound to be easily and sufficiently formed. Accordingly, it is possible to provide higher effects.

In addition, the secondary battery may be a lithium-ion secondary battery. This allows a sufficient battery capacity to be stably obtained by utilizing insertion and extraction of lithium. Accordingly, it is possible to provide higher effects.

Next, a description is given of modifications of the secondary battery described above according to an embodiment. As described below, the configuration of the secondary battery is modifiable as appropriate. Note that any two or more of a series of modifications described below may be combined with each other.

The separator 13 that is a porous film is used. However, although not specifically illustrated here, a separator of a stacked type including a polymer compound layer may be used instead of the separator 13 that is a porous film.

For example, the separator of the stacked type includes a porous film having two opposed surfaces, and a polymer compound layer provided on one of or each of the two opposed surfaces of the porous film. A reason for this is that adherence of the separator to each of the positive electrode 11 and the negative electrode 12 is improved, helping to prevent a positional displacement of the battery device 10 from occurring. This helps to prevent the secondary battery from swelling, for example, even when the decomposition reaction of the electrolytic solution occurs. The polymer compound layer includes a polymer compound such as polyvinylidene difluoride. A reason for this is that the polymer compound such as polyvinylidene difluoride has high physical strength and is electrochemically stable.

The porous film, the polymer compound layer, or both may include one or more kinds of insulating particles. A reason for this is that safety (thermal resistance) of the secondary battery is improved as the insulating particles dissipate heat when the secondary battery generates heat. Examples of the insulating particles include inorganic particles and resin particles. Specific examples of the inorganic particles include particles of aluminum oxide, aluminum nitride, boehmite, silicon oxide, titanium oxide, magnesium oxide, and zirconium oxide. Specific examples of the resin particles include particles of acrylic resin and styrene resin.

In a case of fabricating the separator of the stacked type, a precursor solution including, without limitation, a polymer compound and an organic solvent is prepared, following which the precursor solution is applied on one of or each of the two opposed surfaces of the porous film. In this case, insulating particles may be added to the precursor solution on an as-needed basis.

Also in the case where the separator of the stacked type is used, similar effects are obtainable as lithium ions are movable between the positive electrode 11 and the negative electrode 12.

The electrolytic solution that is a liquid electrolyte is used. However, although not specifically illustrate here, an electrolyte layer that is a gel electrolyte may be used instead of the electrolytic solution.

In the battery device 10 including the electrolyte layer, the positive electrode 11 and the negative electrode 12 are stacked on each other with the separator 13 and the electrolyte layer interposed therebetween, and the stack of the positive electrode 11, the negative electrode 12, the separator 13, and the electrolyte layer is wound. The electrolyte layer is interposed between the positive electrode 11 and the separator 13, and between the negative electrode 12 and the separator 13.

For example, the electrolyte layer includes a polymer compound as well as the electrolytic solution. In the electrolyte layer, the electrolytic solution is held by the polymer compound. A reason for this is that liquid leakage is prevented. The configuration of the electrolytic solution is as described above. The polymer compound includes elements including, without limitation, polyvinylidene difluoride. In a case of forming the electrolyte layer, a precursor solution that includes materials including, without limitation, the electrolytic solution, the polymer compound, and an organic solvent is prepared, following which the precursor solution is applied on one of or each of both sides of the positive electrode 11 and one of or each of both sides of the negative electrode 12.

Also in the case where the electrolyte layer is used, similar effects are obtainable as lithium ions are movable between the positive electrode 11 and the negative electrode 12 via the electrolyte layer.

Next, a description is given of applications (application examples) of the above-described secondary battery.

The applications of the secondary battery are not particularly limited as long as they are, for example, machines, equipment, instruments, apparatuses, or systems (an assembly of a plurality of pieces of equipment, for example) in which the secondary battery is usable mainly as a driving power source, an electric power storage source for electric power accumulation, or any other source. The secondary battery used as a power source may serve as a main power source or an auxiliary power source. The main power source is preferentially used regardless of the presence of any other power source. The auxiliary power source may be used in place of the main power source, or may be switched from the main power source on an as-needed basis. In a case where the secondary battery is used as the auxiliary power source, the kind of the main power source is not limited to the secondary battery.

Specific examples of the applications of the secondary battery include: electronic equipment including portable electronic equipment; portable life appliances; apparatuses for data storage; electric power tools; battery packs to be mounted as detachable power sources on, for example, laptop personal computers; medical electronic equipment; electric vehicles; and electric power storage systems. Examples of the electronic equipment include video cameras, digital still cameras, mobile phones, laptop personal computers, cordless phones, headphone stereos, portable radios, portable televisions, and portable information terminals. Examples of the portable life appliances include electric shavers. Examples of the apparatuses for data storage include backup power sources and memory cards. Examples of the electric power tools include electric drills and electric saws. Examples of the medical electronic equipment include pacemakers and hearing aids. Examples of the electric vehicles include electric automobiles including hybrid automobiles. Examples of the electric power storage systems include home battery systems for accumulation of electric power for a situation such as emergency. Note that the secondary battery may have a battery structure of the above-described laminated-film type, a cylindrical type, or any other type. Further, multiple secondary batteries may be used, for example, as a battery pack or a battery module.

In particular, the battery pack and the battery module are each effectively applied to relatively large-sized equipment, etc., including an electric vehicle, an electric power storage system, and an electric power tool. The battery pack, as will be described later, may include a single battery, or may include an assembled battery. The electric vehicle is a vehicle that operates (travels) using the secondary battery as a driving power source, and may be an automobile that is additionally provided with a driving source other than the secondary battery as described above, such as a hybrid automobile. The electric power storage system is a system that uses the secondary battery as an electric power storage source. An electric power storage system for home use accumulates electric power in the secondary battery which is an electric power storage source, and the accumulated electric power may thus be utilized for using, for example, home appliances.

An application example of the secondary battery will now be described in detail. The configuration of the application example described below is merely an example, and is appropriately modifiable.

Figure 3:
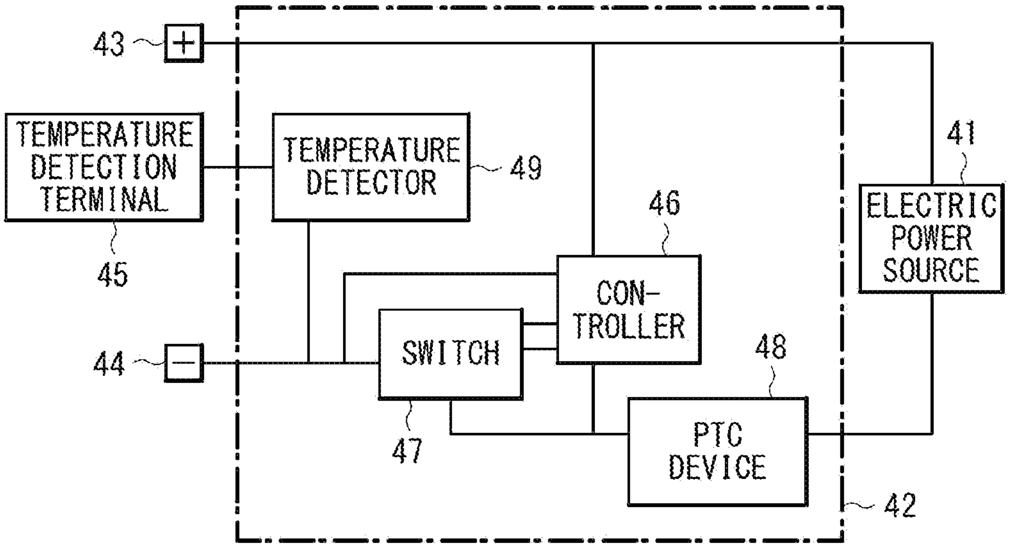
FIG. 3 is a block diagram illustrating a configuration of an application example of the secondary battery.

FIG. 3 illustrates a block configuration of a battery pack. The battery pack described here is a simple battery pack (a so-called soft pack) including one secondary battery, and is to be mounted on, for example, electronic equipment typified by a smartphone.

As illustrated in FIG. 3, the battery pack includes an electric power source 41 and a circuit board 42. The circuit board 42 is coupled to the electric power source 41, and includes a positive electrode terminal 43, a negative electrode terminal 44, and a temperature detection terminal 45. The temperature detection terminal 45 is a so-called T terminal.

The electric power source 41 includes one secondary battery. The secondary battery has a positive electrode lead coupled to the positive electrode terminal 43 and a negative electrode lead coupled to the negative electrode terminal 44. The electric power source 41 is couplable to outside via the positive electrode terminal 43 and the negative electrode terminal 44, and is thus chargeable and dischargeable via the positive electrode terminal 43 and the negative electrode terminal 44. The circuit board 42 includes a controller 46, a switch 47, a thermosensitive resistive device (a positive temperature coefficient (PTC) device) 48, and a temperature detector 49. However, the PTC device 48 may be omitted.

The controller 46 includes, for example, a central processing unit (CPU) and a memory, and controls an overall operation of the battery pack. The controller 46 detects and controls a use state of the electric power source 41 on an as-needed basis.

If a battery voltage of the electric power source 41 (the secondary battery) reaches an overcharge detection voltage or an overdischarge detection voltage, the controller 46 turns off the switch 47. This prevents a charging current from flowing into a current path of the electric power source 41. In addition, if a large current flows upon charging or discharging, the controller 46 turns off the switch 47 to block the charging current. The overcharge detection voltage and the overdischarge detection voltage are not particularly limited. For example, the overcharge detection voltage is 4.2 V±0.05 V and the overdischarge detection voltage is 2.4 V±0.1 V.

The switch 47 includes, for example, a charge control switch, a discharge control switch, a charging diode, and a discharging diode. The switch 47 performs switching between coupling and decoupling between the electric power source 41 and external equipment in accordance with an instruction from the controller 46. The switch 47 includes, for example, a metal-oxide-semiconductor field-effect transistor (MOSFET) including a metal-oxide semiconductor. The charging and discharging currents are detected on the basis of an ON-resistance of the switch 47.

The temperature detector 49 includes a temperature detection device such as a thermistor. The temperature detector 49 measures a temperature of the electric power source 41 using the temperature detection terminal 45, and outputs a result of the temperature measurement to the controller 46. The result of the temperature measurement to be obtained by the temperature detector 49 is used, for example, in a case where the controller 46 performs charge/discharge control upon abnormal heat generation or in a case where the controller 46 performs a correction process upon calculating a remaining capacity.

EXAMPLES

A description is given of Examples of the present technology according to an embodiment.

Experiment Examples 1 to 72

As described below, secondary batteries (lithium-ion secondary batteries) of the laminated-film type illustrated in FIG. 1 and FIG. 2 were fabricated, following which a performance of each of the secondary batteries was evaluated.

[Fabrication of Secondary Battery]

Each of the secondary batteries was fabricated according to the following procedure.

(Fabrication of Positive Electrode)

First, 91 parts by mass of a positive electrode active material (lithium cobalt oxide ($LiCoO_2$)), 3 parts by mass of a positive electrode binder (polyvinylidene difluoride), and 6 parts by mass of a positive electrode conductor (graphite) were mixed with each other to thereby obtain a positive electrode mixture. Thereafter, the positive electrode mixture was put into an organic solvent (N-methyl-2-pyrrolidone), following which the organic solvent was stirred to thereby prepare a positive electrode mixture slurry in a paste form. Thereafter, the positive electrode mixture slurry was applied on each of the two opposed surfaces of the positive electrode current collector 11A (a band-shaped aluminum foil having a thickness of 12 μm) by means of a coating apparatus, following which the applied positive electrode mixture slurry was dried to thereby form the positive electrode active material layer 11B. Lastly, the positive electrode active material layer 11B was compression-molded by means of a roll pressing machine. The positive electrode active material layer 11B was thus formed on each of the two opposed surfaces of the positive electrode current collector 11A. As a result, the positive electrode 11 was fabricated.

(Fabrication of Negative Electrode)

First, 93 parts by mass of a negative electrode active material (artificial graphite that is a carbon material) and 7 parts by mass of a negative electrode binder (polyvinylidene difluoride) were mixed with each other to thereby obtain a negative electrode mixture. Thereafter, the negative electrode mixture was put into an organic solvent (N-methyl-2-pyrrolidone), following which the organic solvent was stirred to thereby prepare a negative electrode mixture slurry in a paste form. Thereafter, the negative electrode mixture slurry was applied on each of the two opposed surfaces of the negative electrode current collector 12A (a band-shaped copper foil having a thickness of 15 μm) by means of a coating apparatus, following which the applied negative electrode mixture slurry was dried to thereby form the negative electrode active material layer 12B. Lastly, the negative electrode active material layer 12B was compression-molded by means of a roll pressing machine. The negative electrode active material layer 12B was thus formed on each of the two opposed surfaces of the negative electrode current collector 12A. As a result, the negative electrode 12 is fabricated.

(Preparation of Electrolytic Solution)

First, a solvent was prepared. Used as the solvent were ethylene carbonate and diethyl carbonate that are carbonic-acid-ester-based compounds (a cyclic carbonic acid ester and a chain carbonic acid ester), and propyl propionate and ethyl propionate that are carboxylic-acid-ester-based compounds (chain carboxylic acid esters). The mixing ratio (weight ratio) of the solvent among ethylene carbonate, diethyl carbonate, propyl propionate, and ethyl propionate was 3:1:3:3.

Thereafter, an electrolyte salt (lithium hexafluorophosphate ($LiPF_6$)) was added to the solvent, following which the solvent was stirred. The content of the electrolyte salt was 1 mol/kg with respect to the solvent.

Thereafter, another solvent was added to the solvent (including the electrolyte salt), following which the solvent was stirred. Used as the other solvent were vinylene carbonate that is an unsaturated cyclic carbonic acid ester, and fluoroethylene carbonate that is a halogenated carbonic acid ester. The additive amount of the unsaturated cyclic carbonic acid ester was 1 wt % with respect to the solvent, and the content of the halogenated carbonic acid ester was 1 wt % with respect to the solvent.

Lastly, the carbonic acid ester compound was added to the solvent (including the electrolyte salt and the other solvent), following which the solvent was stirred. Kinds of the carbonic acid ester compound were as listed in Tables 1 to 3. The electrolyte salt and the carbonic acid ester compound were thus each dispersed or dissolved into the solvent (including the other solvent). As a result, the electrolytic solution was prepared.

An electrolytic solution for comparison was prepared according to a similar procedure except that another compound was used instead of the carbonic acid ester compound. Kinds of the other compound were as listed in Table 3.

(Assembly of Secondary Battery)

First, the positive electrode lead 14 including aluminum was welded to the positive electrode 11 (the positive electrode current collector 11A), and the negative electrode lead 15 including copper was welded to the negative electrode 12 (the negative electrode current collector 12A).

Thereafter, the positive electrode 11 and the negative electrode 12 were stacked on each other with the separator 13 (a fine-porous polyethylene film having a thickness of 15 μm) interposed therebetween, following which the stack of the positive electrode 11, the negative electrode 12, and the separator 13 was wound to thereby fabricate a wound body. Thereafter, the wound body was molded into an elongated shape by pressing the wound body with a pressing machine.

Thereafter, the outer package film 20 was folded so as to sandwich the wound body contained inside the depression part 20U, following which the outer edges of two sides of the outer package film 20 (the fusion-bonding layer) were thermal-fusion-bonded to each other. As a result, the wound body was contained in the outer package film 20 having the pouch shape. Used as the outer package film 20 was an aluminum laminated film in which a fusion-bonding layer (a polypropylene film having a thickness of 30 μm), a metal layer (an aluminum foil having a thickness of 40 μm), and a surface protective layer (a nylon film having a thickness of 25 μm) were stacked in this order from the inner side.

Lastly, the electrolytic solution was injected into the outer package film 20 having the pouch shape, following which the outer edges of the remaining one side of the outer package film 20 (fusion-bonding layer) were thermal-fusion-bonded to each other in a reduced-pressure environment. In this case, the sealing film 21 (a polypropylene film having a thickness of 5 μm) was interposed between the outer package film 20 and the positive electrode lead 14, and the sealing film 22 (a polypropylene film having a thickness of 5 μm) was interposed between the outer package film 20 and the negative electrode lead 15. Thus, the wound body was impregnated with the electrolytic solution to thereby fabricate the battery device 10. Accordingly, the battery device was sealed in the outer package film 20. As a result, a secondary battery was assembled.

(Stabilization of Secondary Battery)

The secondary battery was charged and discharged for one cycle in an ambient temperature environment (at a temperature of 23° C.). Upon charging, the secondary battery was charged with a constant current of 0.1 C until a voltage reached 4.2 V, following which the secondary battery was charged with a constant voltage of 4.2 V until a current reached 0.05 C. Upon discharging, the secondary battery was discharged with a constant current of 0.1 C until the voltage reached 3.0 V. "0.1 C" refers to a value of a current that causes a battery capacity (theoretical capacity) to be completely discharged in 10 hours, and "0.05 C" refers to a value of a current that causes the battery capacity to be completely discharged in 20 hours.

This formed a film on surfaces including a surface of the negative electrode 12, stabilizing the state of the secondary battery. As a result, the secondary battery of the laminated-film type was completed.

After the completion of the secondary battery, the content (wt %) of the carbonic acid ester compound in the electrolytic solution and the content (wt %) of the other compound in the electrolytic solution were measured by inductively coupled high frequency plasma (Inductively Coupled Plasma (ICP))-optical emission spectrometry. The results of the measurement were as listed in Tables 1 to 3.

Evaluation of a performance (a cyclability characteristic) of each of the secondary batteries revealed the results listed in Tables 1 to 3.

In a case of examining the cyclability characteristic, first, the secondary battery was charged and discharged in an ambient temperature environment to thereby measure a discharge capacity (a first-cycle discharge capacity). Thereafter, the secondary battery was repeatedly charged and discharged in the same environment until the total number of cycles reached 300 cycles to thereby measure a discharge capacity (a 300th-cycle discharge capacity). Note that charging and discharging conditions were similar to the charging and discharging conditions for stabilizing the secondary battery described above. Lastly, a capacity retention rate was calculated as follows: capacity retention rate (%)=(300th-cycle discharge capacity/first-cycle discharge capacity)×100.

TABLE 1

| | Carbonic acid ester compound | | Other compound | | Capacity retention |
|---|---|---|---|---|---|
| Experiment example | Kind | Content (wt %) | Kind | Content (wt %) | rate (%) |
| 1 | Formula (1-1) | 0.0001 | — | — | 76 |
| 2 | | 0.001 | | | 78 |
| 3 | | 0.01 | | | 85 |
| 4 | | 0.1 | | | 83 |
| 5 | | 1 | | | 82 |
| 6 | | 3 | | | 82 |
| 7 | | 5 | | | 67 |
| 8 | Formula (1-2) | 0.01 | | | 84 |
| 9 | Formula (1-3) | 0.01 | | | 82 |
| 10 | Formula (1-4) | 0.01 | | | 82 |
| 11 | Formula (1-5) | 0.01 | | | 82 |
| 12 | Formula (1-6) | 0.01 | | | 81 |
| 13 | Formula (1-7) | 0.01 | | | 79 |
| 14 | Formula (1-8) | 0.0001 | | | 76 |
| 15 | | 0.001 | | | 77 |
| 16 | | 0.01 | | | 82 |
| 17 | | 0.1 | | | 81 |
| 18 | | 1 | | | 80 |
| 19 | | 3 | | | 79 |
| 20 | | 5 | | | 68 |
| 21 | Formula (1-9) | 0.01 | | | 82 |
| 22 | Formula (1-10) | 0.01 | | | 81 |
| 23 | Formula (1-11) | 0.01 | | | 80 |
| 24 | Formula (1-12) | 0.01 | | | 80 |

TABLE 2

| | Carbonic acid ester compound | | Other compound | | Capacity retention |
|---|---|---|---|---|---|
| Experiment example | Kind | Content (wt %) | Kind | Content (wt %) | rate (%) |
| 25 | Formula (1-13) | 0.01 | — | — | 79 |
| 26 | Formula (1-14) | 0.01 | | | 80 |
| 27 | Formula (1-15) | 0.01 | | | 79 |
| 28 | Formula (1-16) | 0.01 | | | 81 |
| 29 | Formula (1-17) | 0.01 | | | 80 |
| 30 | Formula (1-18) | 0.01 | | | 80 |
| 31 | Formula (1-19) | 0.01 | | | 79 |
| 32 | Formula (1-20) | 0.01 | | | 78 |
| 33 | Formula (1-21) | 0.01 | | | 79 |
| 34 | Formula (1-22) | 0.01 | | | 78 |
| 35 | Formula (1-23) | 0.01 | | | 81 |
| 36 | Formula (1-24) | 0.01 | | | 80 |
| 37 | Formula (1-25) | 0.01 | | | 77 |
| 38 | Formula (1-26) | 0.01 | | | 77 |
| 39 | Formula (1-27) | 0.01 | | | 78 |
| 40 | Formula (1-28) | 0.01 | | | 80 |
| 41 | Formula (1-29) | 0.01 | | | 80 |
| 42 | Formula (1-30) | 0.01 | | | 81 |
| 43 | Formula (1-31) | 0.01 | | | 77 |
| 44 | Formula (1-32) | 0.01 | | | 76 |
| 45 | Formula (1-33) | 0.01 | | | 76 |
| 46 | Formula (1-34) | 0.01 | | | 77 |
| 47 | Formula (1-35) | 0.01 | | | 78 |
| 48 | Formula (1-36) | 0.01 | | | 76 |
| 49 | Formula (1-37) | 0.01 | | | 75 |

TABLE 3

| Ex- | Carbonic acid ester compound | | Other compound | | Capacity retention |
|---|---|---|---|---|---|
| periment example | Kind | Content (wt %) | Kind | Content (wt %) | rate (%) |
| 50 | Formula (1-38) | 0.01 | — | — | 76 |
| 51 | Formula (1-39) | 0.01 | | | 77 |
| 52 | Formula (1-40) | 0.01 | | | 78 |
| 53 | Formula (1-41) | 0.01 | | | 76 |
| 54 | Formula (1-42) | 0.01 | | | 75 |
| 55 | — | — | — | — | 42 |
| 56 | — | — | Formula (1-51) | 0.01 | 61 |
| 57 | | | Formula (1-52) | 0.01 | 64 |
| 58 | | | Formula (1-53) | 0.01 | 60 |
| 59 | | | Formula (1-62) | 0.01 | 59 |
| 60 | | | Formula (1-63) | 0.01 | 61 |
| 61 | | | Formula (1-64) | 0.01 | 62 |
| 62 | | | Formula (1-60) | 0.01 | 63 |
| 63 | | | Formula (1-61) | 0.01 | 60 |
| 64 | | | Formula (1-54) | 0.01 | 63 |
| 65 | | | Formula (1-55) | 0.01 | 61 |
| 66 | | | Formula (1-56) | 0.01 | 63 |
| 67 | | | Formula (1-57) | 0.01 | 61 |
| 68 | | | Formula (1-58) | 0.01 | 64 |
| 69 | | | Formula (1-59) | 0.01 | 61 |
| 70 | | | Formula (1-65) | 0.01 | 66 |
| 71 | | | Formula (1-66) | 0.01 | 64 |
| 72 | | | Formula (1-67) | 0.01 | 63 |

As listed in Tables 1 to 3, the capacity retention rate greatly varied depending on the composition of the electrolytic solution. In the following description, the capacity retention rate in the case where the electrolytic solution included neither the carbonic acid ester compound nor the other compound (Experiment example 55) is used as a comparative reference.

For example, in cases where the electrolytic solution included the other compound (Experiment examples 56 to 72), the capacity retention rate was increased but not sufficiently high. In contrast, in cases where the electrolytic solution included the carbonic acid ester compound (Experiment examples 1 to 54), the capacity retention rate was largely increased and thus sufficiently high.

In particular, in the case where the electrolytic solution included the carbonic acid ester compound, the following tendencies were observed.

First, in a case where the carbon number of each of the alkyl group and the alkoxy group was 3 or less, the capacity retention rate was further increased as compared with a case where the carbon number of each of the alkyl group and the alkoxy group was 4 or greater.

Second, in a case where each of m and n was 2, the capacity retention rate was further increased as compared with a case where each of m and n was 3.

Third, in a case where each of R1 and R2 was a group other than the alkoxyalkoxy group and the hydroxyalkoxy group, the capacity retention rate was further increased as compared with a case where each of R1 and R2 was one of the alkoxyalkoxy group and the hydroxyalkoxy group.

Fourth, in a case where each of R3 to R6 was a group other than the halogen group, the capacity retention rate was further increased as compared with a case where each of R3 to R6 was the halogen group.

Fifth, in a case where the content of the carbonic acid ester compound in the electrolytic solution was 3 wt % or less, the capacity retention rate was further increased. In this case, the capacity retention rate was further increased in a case where the content of the carbonic acid ester was 0.001 wt % or greater.

Sixth, in a case where the electrolytic solution included the cyclic carbonic acid ester, the chain carbonic acid ester, and the chain carboxylic acid ester as well as the carbonic acid ester compound, a sufficiently high capacity retention rate was obtained.

As in the results listed in Tables 1 to 3, the capacity retention rate was sufficiently high in the case where the electrolytic solution included the carbonic acid ester compound. Accordingly, a superior cyclability characteristic of the secondary battery was obtained.

Although the present technology has been described herein, configurations of the present technology are not limited thereto and are therefore modifiable in a variety of ways.

For example, although the description has been given of the case where the battery structure of the secondary battery is of the laminated-film type, the battery structure is not particularly limited. Alternatively, the secondary battery may have other structures including, without limitation, those of a cylindrical type, a prismatic type, a coin type, and a button type.

Moreover, although the description has been given of the case where the device structure of the battery device is of the wound type, the device structure of the battery device is not particularly limited. Alternatively, the battery device may have other device structures including, without limitation, those of a stacked type in which the electrodes (the positive electrode and the negative electrode) are stacked on each other, and a zigzag folded type in which the electrodes (the positive electrode and the negative electrode) are folded in a zigzag manner.

Further, although the description has been given of the case where the electrode reactant is lithium, the electrode reactant is not limited to a particular element. Specifically, the electrode reactant may be another alkali metal such as sodium or potassium, or may be an alkaline earth metal such as beryllium, magnesium, or calcium, as described above. Alternatively, the electrode reactant may be another light metal such as aluminum.

Note that the applications of the electrolytic solution described herein are not limited to the secondary battery. The electrolytic solution may be applied to another electrochemical device such as a capacitor.

Note that the effects described herein are mere examples, and effects of the present technology are therefore not limited to those described herein. Accordingly, the present technology may achieve any other effect.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising:

a positive electrode;

a negative electrode; and an electrolytic solution including a carbonic acid ester compound represented by Formula (1), (1)

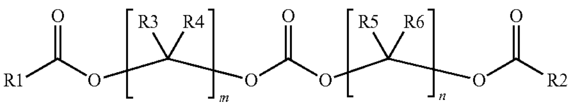

where each of R3, R4, R5, and R6 is one of a hydrogen group, an alkyl group having carbon number of 1 or greater and 4 or less, or a halogen group, and each of m and n is 2 or 3, wherein R1 is an alkoxy group having a carbon number of 1 or greater and 4 or less, and wherein R2 is one of an alkyl group having a carbon number of 1 or greater and 4 or less, a vinyl group, a vinyloxy group, or a halogen group.

2. The secondary battery according to claim 1, wherein the alkyl group of R2 has the carbon number of 1 to 3, and wherein the alkoxy group of R1 has the carbon number of 1 to 3.

3. The secondary battery according to claim 1, wherein each of m and n is 2.

4. The secondary battery according to claim 1, wherein each of R3, R4, R5, and R6 is one of the hydrogen group or the alkyl group.

5. The secondary battery according to claim 1, wherein a content of the carbonic acid ester compound in the electrolytic solution is 3 weight percent or less.

6. The secondary battery according to claim 5, wherein the content of the carbonic acid ester compound in the electrolytic solution is 0.001 weight percent to 3 weight percent.

7. The secondary battery according to claim 1, wherein the electrolytic solution further includes a cyclic carbonic acid ester, a chain carbonic acid ester, and a chain carboxylic acid ester.

8. The secondary battery according to claim 1, wherein the secondary battery comprises a lithium-ion secondary battery.

9. An electrolytic solution for a secondary battery, the electrolytic solution comprising a carbonic acid ester compound represented by Formula (1), (1)

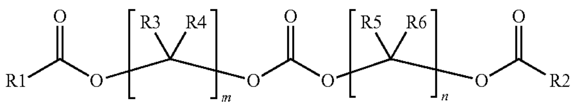

where each of R3, R4, R5, and R6 is one of a hydrogen group, an alkyl group having carbon number of 1 or greater and 4 or less, or a halogen group, and each of m and n is 2 or 3, wherein R1 is an alkyl group having a carbon number of 1 or greater and 4 or less, and wherein R2 is one of an alkoxy group having a carbon number of 1 or greater and 4 or less, a vinyl group, a vinyloxy group, or a halogen group.

10. The electrolytic solution according to claim 9, wherein R2 is the alkoxy group having the carbon number of 1 or greater and 4 or less, or the halogen group.

11. The secondary battery according to claim 1, wherein R2 is the alkyl group having the carbon number of 1 or greater and 4 or less, or the halogen group.

12. A secondary battery comprising:

a positive electrode;

a negative electrode; and an electrolytic solution including a carbonic acid ester compound represented by Formula (1), (1)

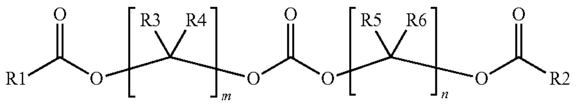

where each of R3, R4, R5, and R6 is one of a hydrogen group, an alkyl group having carbon number of 1 or greater and 4 or less, or a halogen group, and each of m and n is 2 or 3, wherein R1 is an alkyl group having a carbon number of 1 or greater and 4 or less, and wherein R2 is one of an alkoxy group having a carbon number of 1 or greater and 4 or less, a vinyl group, a vinyloxy group, or a halogen group.

13. The secondary battery according to claim 12, wherein the alkyl group of R1 has the carbon number of 1 to 3, and wherein the alkoxy group of R2 has the carbon number of 1 to 3.

14. The secondary battery according to claim 12, wherein each of m and n is 2.

15. The secondary battery according to claim 12, wherein each of R3, R4, R5, and R6 is one of the hydrogen group or the alkyl group.

16. The secondary battery according to claim 12, wherein a content of the carbonic acid ester compound in the electrolytic solution is 3 weight percent or less.

17. The secondary battery according to claim 16, wherein the content of the carbonic acid ester compound in the electrolytic solution is 0.001 weight percent to 3 weight percent.

18. The secondary battery according to claim 12, wherein the electrolytic solution further includes a cyclic carbonic acid ester, a chain carbonic acid ester, and a chain carboxylic acid ester.

19. The secondary battery according to claim 12, wherein the secondary battery comprises a lithium-ion secondary battery.

* * * * *